United States Patent [19]
Stillhard

[11] Patent Number: 5,266,874
[45] Date of Patent: Nov. 30, 1993

[54] DRIVE ARRANGEMENT FOR A MOLDING MACHINE

[75] Inventor: Bruno Stillhard, St. Gallen, Switzerland

[73] Assignee: Vickers, Incorporated, Troy, Mich.

[21] Appl. No.: 607,887

[22] Filed: Nov. 1, 1990

[30] Foreign Application Priority Data

Nov. 10, 1989 [CH] Switzerland ............... 4062/89

[51] Int. Cl.⁵ .................. G05B 19/18; B29C 33/22
[52] U.S. Cl. ...................... 318/560; 318/569; 425/451.2; 425/589
[58] Field of Search ............... 318/560–646, 318/135, 134, 132, 131; 425/950.1, 451.2, 451.3, 451.4, 451.5, 451.7, 451.6, 451.9, 587, 589, 595; 310/83, 16, 80; 74/427

[56] References Cited

U.S. PATENT DOCUMENTS

| | | | |
|---|---|---|---|
| 4,494,025 | 1/1985 | Fickler | 310/80 |
| 4,615,230 | 10/1986 | Guichard | 74/427 |
| 4,696,632 | 9/1987 | Inaba | 425/451.2 |
| 4,718,845 | 1/1988 | Sheffield et al. | 425/450.1 |
| 4,767,955 | 8/1988 | McDaniel | 310/80 |
| 4,781,568 | 11/1988 | Inaba | 425/451.7 |
| 4,841,208 | 6/1989 | Itoh | 318/561 |
| 4,841,211 | 6/1989 | Neko | 318/569 |
| 4,879,077 | 11/1989 | Shimizu et al. | 425/587 |
| 4,906,173 | 3/1990 | Inaba et al. | 425/450.1 |
| 4,929,165 | 5/1990 | Inaba et al. | 425/451.2 |
| 4,950,146 | 8/1990 | Adachi | 425/589 |
| 4,968,239 | 11/1990 | Inaba et al. | 425/451.2 |
| 4,984,980 | 1/1991 | Ueno | 425/595 |
| 4,990,084 | 2/1991 | Reinhart | 425/451.2 X |
| 5,002,242 | 3/1991 | Nagai | 901/50 |
| 5,110,283 | 5/1992 | Bluml et al. | 425/589 |

FOREIGN PATENT DOCUMENTS

| | | |
|---|---|---|
| 0271588 | 6/1988 | European Pat. Off. . |
| 0277249 | 8/1988 | European Pat. Off. . |
| 0281637 | 9/1988 | European Pat. Off. . |
| 61-189859 | 8/1986 | Japan . |

Primary Examiner—Paul Ip
Attorney, Agent, or Firm—Barnes, Kisselle, Raisch, Choate, Whittemore & Hulbert

[57] ABSTRACT

A drive arrangement for an injection molding machine (1) embodies a linear drive (5,10,11) for moving and/or locking mold mounting plates (2,3), or rather the molds mounted thereon. The linear drive is provided with at least one toothed rack (5) which on the drive output side is in direct functional connection with the mold mounting plate (3), and on the drive input side presents series of teeth (12a,12b) that mesh with at least one drive gearwheel (16,17).

17 Claims, 4 Drawing Sheets

DRIVE ARRANGEMENT FOR A MOLDING MACHINE

BACKGROUND OF THE INVENTION

The invention relates to a drive arrangement for a molding machine and more particularly, but not exclusively, the mold plates of an injection molding machine.

DESCRIPTION OF THE PRIOR ART

For many years, the majority of injection molding machines have utilised hydraulic cylinders as drive means. For several years now, drive motors—particularly electric drives and servomotors—have been employed for moving the mold mounting plates. In drives of this kind, use is made of an electric servomotor which runs at relatively high speed, the rotary movement of the motor being converted into linear movement through the agency of a ball-spindle or ball-screw that runs in a ball-spindle or ball-screw bearing.

Drives of this kind have been shown and described in various publications, e.g. EP-A-1 271 588, EP-A-1 281 637 and EP-A-1 277 249. In expert circles, it has thus been assumed that the use of motors—especially electric motors—as drive means for injection molding machines necessarily presupposes the use of a screw or ball-spindle as a linear drive. The known drives enjoy many advantages over the hydraulic drives. However, they are exceptionally prone to wear, while the high rotation speeds of ball-spindles lead to relatively high moments of rotational inertia and corresponding difficult control and drive characteristics. Further to these disadvantages, ball-spindle drives of this kind are overly complicated and expensive to manufacture, and they cannot be protected from environmental influences—e.g. by enclosing them—if only because the ball-spindle has to be provided with a screw thread over its entire length and, moreover, because it runs in a ball-spindle bearing on the mold mounting plate.

In JP-A-61-189859 there is disclosed clamping apparatus for a vertical injection molding machine in which mold plates are moved relative to each other by a linear drive in the form of rack and pinion means, with the rack having two opposed pinions. Each pinion is driven by a brake-equipped reversible electric motor or a hydraulic motor. The motors are energised and de-energised by limit switches with consequential lack of fine control. More particularly, this arrangement suffers from the following disadvantages:

1. Precise final positioning of the mold plates is difficult to achieve.
2. Limited acceleration and deceleration control during mold plate clamping operation.
3. Requires slower movements to ensure final clamp position is attained without overshoot which can be damaging.
4. During the acceleration phase, torque is not controlled to allow optimum acceleration profiles. Thus acceleration has to be limited to avoid peak G loading on the machine frame and mounts.

SUMMARY OF THE INVENTION

The object underlying the invention is to avoid the disadvantages of the known art, and in particular to utilize this knowledge in the production of a drive arrangement for a molding machine, namely an arrangement which can be employed as a general-purpose means of executing the various sequences of movement at different drive locations on the molding machine, while at the same time developing high forces, attaining high speeds and being economical to manufacture and maintain.

According to the present invention there is provided a drive arrangement for a molding machine possessing a machine bed and two components which are mounted thereon and are displaceable relative to each other, and further possessing at least one linear drive for moving and/or locking at least one component, characterised in that the linear drive comprises at least one servomotor, at least one set of gears, and a toothed rack which is, on the drive output side, in direct functional connection with said one component and on the drive input side, presents a series of teeth that mesh with at least one drive gearwheel of the set of gears.

By utilizing a toothed rack drive known per se, in conjunction with a servomotor also known per se, not only is the design configuration of the drive simplified in a wholly surprising way, but this control and drive characteristics of the molding machine are decisively improved, also in a way that could not be expected. For example, the moment of rotational inertia is decisively reduced because the rack executes linear movements, as well as by virtue of the necessary—i.e. large—reduction ratio provided by the gears between the drive motor and the rack. Reducing the rotational inertia in this way reduces wear and improves the control characteristics, as well as enabling higher mold-movement accelerations to be achieved.

Further decisive advantages also result, including low manufacturing costs and drive arrangements which entail substantially less wear than drives employing ball-spindles.

An arrangement possessing exceptional mechanical stiffness results if the rack is provided with series of teeth on at least two sides which are preferably opposite each other, and if two drive gearwheels are provided. Such an arrangement enables the driving force to be introduced into the rack on both sides, and this leads to lower tooth loads and less tooth wear, as well as to an improvement in the rack movement characteristics.

The drive arrangement according to the invention is particularly suitable for generating high locking forces if the driving gearwheels propel the rack from at least two sides, via separate sets of gears and preferably through the agency of separate drive motors.

The invention makes it possible to adopt an enclosed style of construction, especially if the rack has a circular cross-section and is provided with series of transverse teeth over only a defined portion of its length. If thus configured, the rack can be led into a gear casing via a device such as a through-bearing, and be sealed by means of a conventional O-ring or lip-type seal.

A toggle-action force-boosting device is usually provided for generating the locking force. Like the motor, this device can act on either the rack or the gears, as will be known to an expert, who will regard this as conventional.

BRIEF DESCRIPTION OF THE DRAWINGS

Illustrative embodiments of the invention will now be described in greater detail, by way of example, with reference to the drawings in which:

FIG. 4 shows a section through the rack along line IV—IV in FIG. 2.

DESCRIPTION OF THE ENCLOSED EMBODIMENTS

Figure 1:
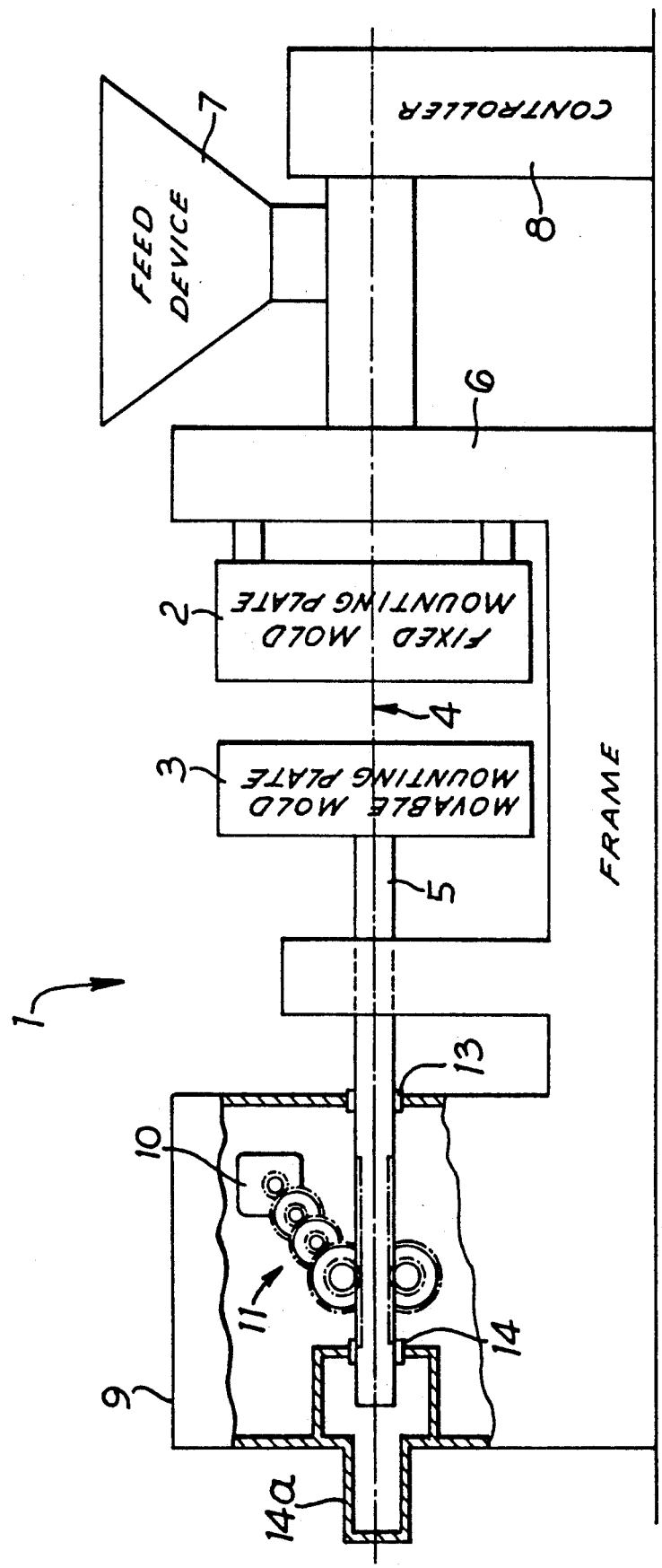
FIG. 1 shows a schematic representation of an injection molding machine with the features of the invention.

FIG. 1 shows an injection molding machine 1, possessing a fixed mold mounting plate 2 and a movable mold mounting plate 3. The mold mounting plates 2, 3 are mounted on an axis 4, in a manner such that on displacing a toothed rack 5, their positions relative to each other can be varied, and this movement causes a mold, clamped in the plates but not indicated in the drawing, to be opened or closed in a known manner. The injection molding machine 1 is provided with a frame portion 6 (represented only schematically), a feed device 7 for the plastics material and a control unit 8. A casing 9, mounted on the frame portion 6, contains an electric servomotor 10 and a set of gears 11, arranged in a manner such that the rack 5 can be caused to execute linear movements. Furthermore, the rack 5 is configured as a cylindrical bar which is provided with a series of teeth 12 over only a certain portion of its length on the left-hand end as seen in FIG. 1. The length of the series of teeth depends on the distance through which it is desired that the movable mold mounting plate 3 should be driven forward. The rack 5 is supported at both ends in bearings 13, 14 which permit sliding. In addition, the casing 9 is provided with a cylinder-like protrusion 14a which receives and protects the rack when it is displaced to the leftward limit of its travel.

The casing 9 is closed on all sides, and protects the gears 11 and the teeth 12 from dirt accretion and damage. At the same time, the slide-bearing 13 acts as a seal to prevent dirt ingress and leakage of grease or some other lubricant from the casing 9.

Figure 2:
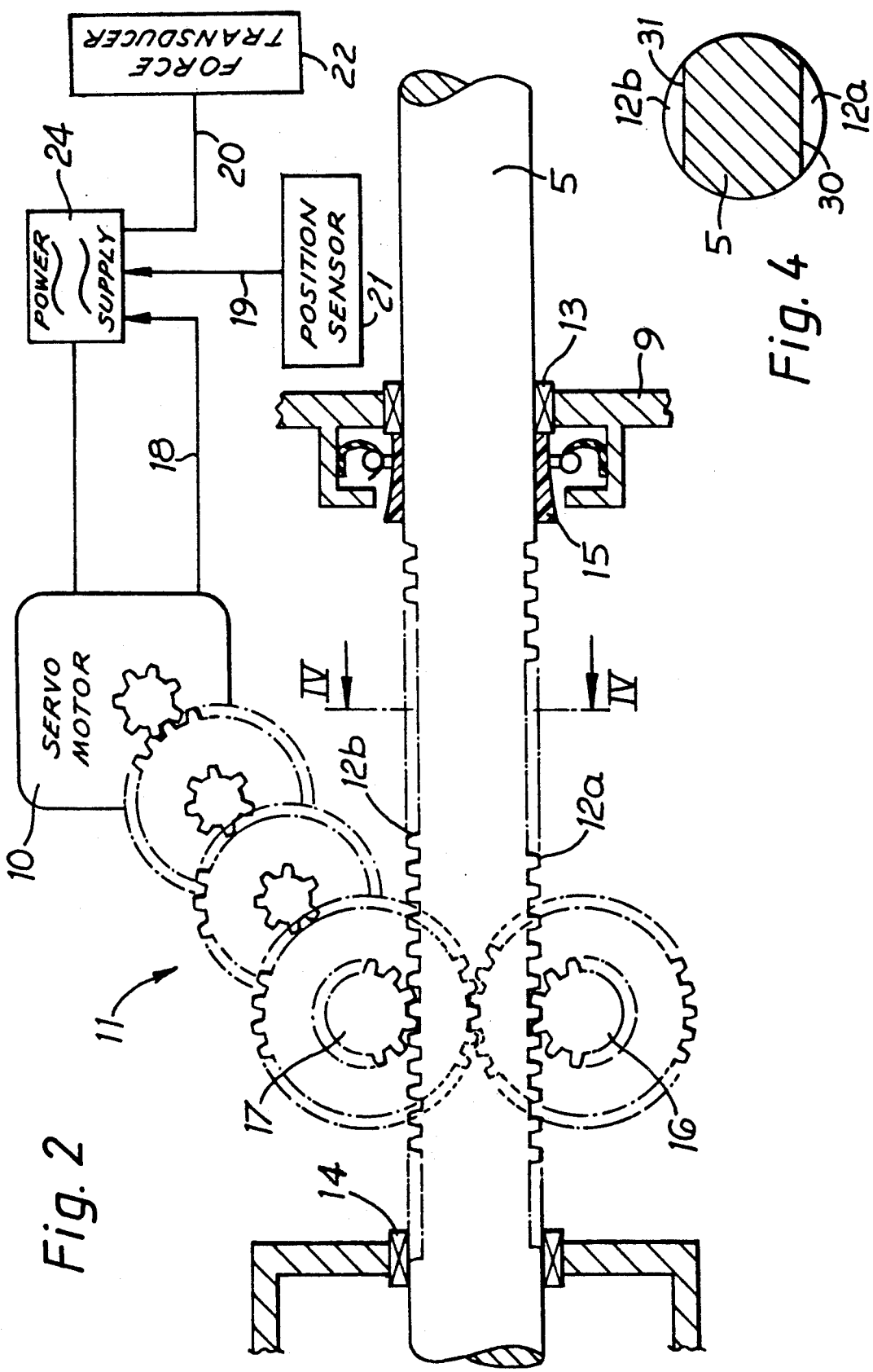
FIG. 2 shows a schematic representation of various components of a drive arrangement.

FIG. 2 shows the mounting of a rack 5 in two slide-bearings 13 and 14, a Teflon scraper/sealing ring 15 being fitted in front of the slide-bearing 13 so as to guarantee dependable sealing.

The cylindrical rack 5 is provided with a pair of diametrically opposed flats 30,31 (FIG. 4) formed with respective series of teeth 12a, 12b, with which the two drive gearwheels or pinions 16, 17 associated with the sets of gears 11 mesh. Because the rack 5 is mounted in bearings at both ends, any tendency for it to tilt in the bearings 13, 14 is eliminated and, moreover, wear on the series of teeth 12a, 12b is reduced. In this embodiment, both drive gearwheels 16, 17 are driven through the sets of gears 11 by the common servomotor 10. The servomotor 10 is provided with a power supply apparatus 24 as indicated diagrammatically. This power supply apparatus 24 receives feedback signals via a return line 18 from a tachometer (not represented) in the servomotor 10, via a return line 19 from a position transmitter 21 for monitoring the rack position, and via a return line 20 a force signal from a force transducer 22 for monitoring the locking force as between the plates 2 and 3.

The design and constructional details of servo and control drives of this kind are known, and are conventional.

Figure 3:
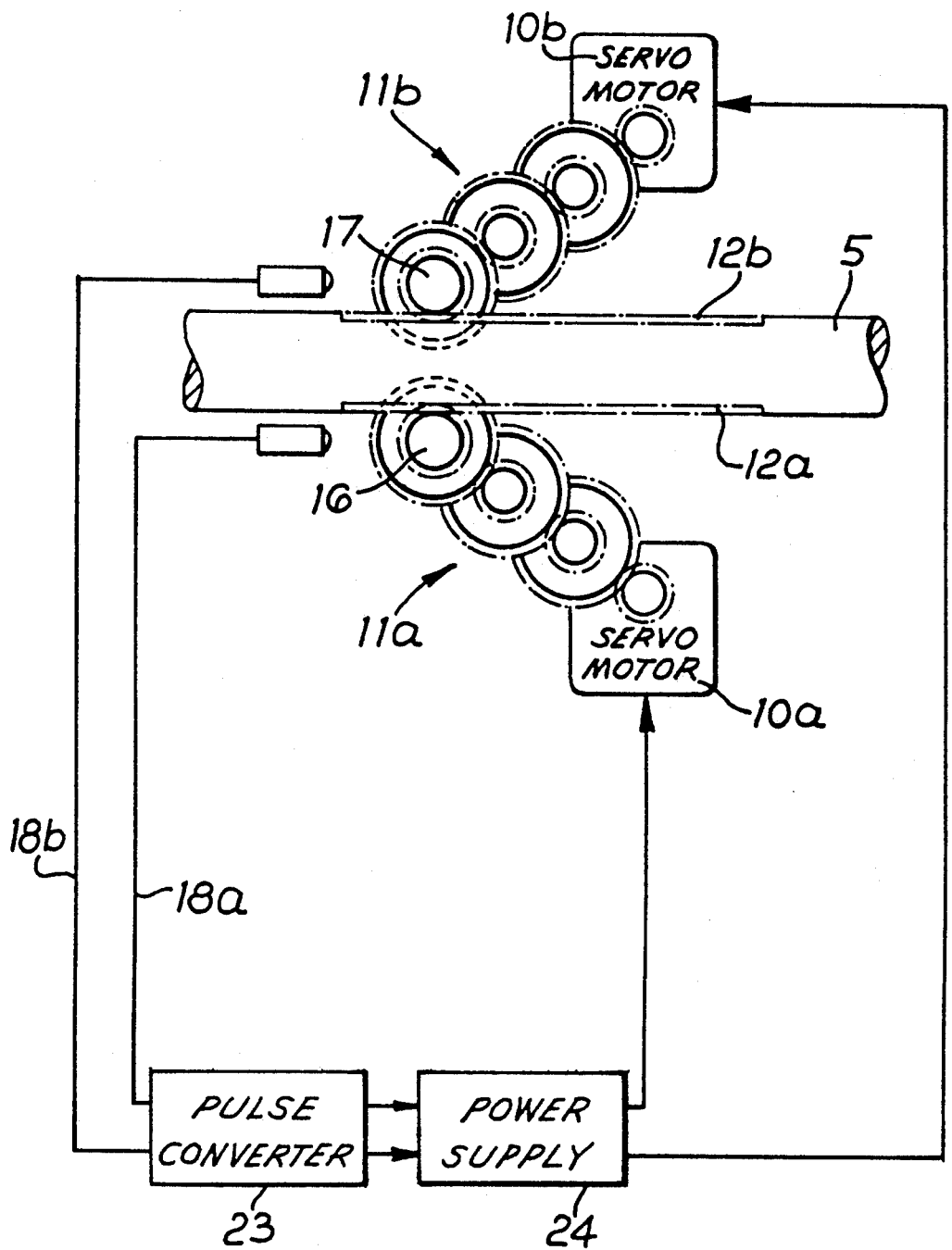
FIG. 3 shows a modified illustrative embodiment of a drive arrangement.

FIG. 3 shows an alternative embodiment in which two servomotors 10a, 10b are provided, each driving a drive gearwheel 16, 17 which is assigned to it, in each case via a separate set of gears 11a, 11b. The power supply apparatus 24 for the two servomotors 10a, 10b is triggered to function in a manner such that the two drive gearwheels 16, 17 rotate in synchronism, this being accomplished by providing position feedback signals via the return lines 18a, 18b and by utilizing a pulse converter 23. The arrangement shown makes it possible, in particular, to transmit high forces and to achieve high accelerations.

The rack 5 shown in FIG. 3 is of cylindrical configuration, similar to the rack shown in FIG. 2, and is provided with series of teeth 12a, 12b on both sides.

Furthermore, instead of a single rack 5, it will be appreciated that two or more racks could be provided, and that they could be driven in common, e.g. by separate gearwheel 16, 17 for each, or by common gearwheels which would be designed to be of an appropriate width.

Figure 5:
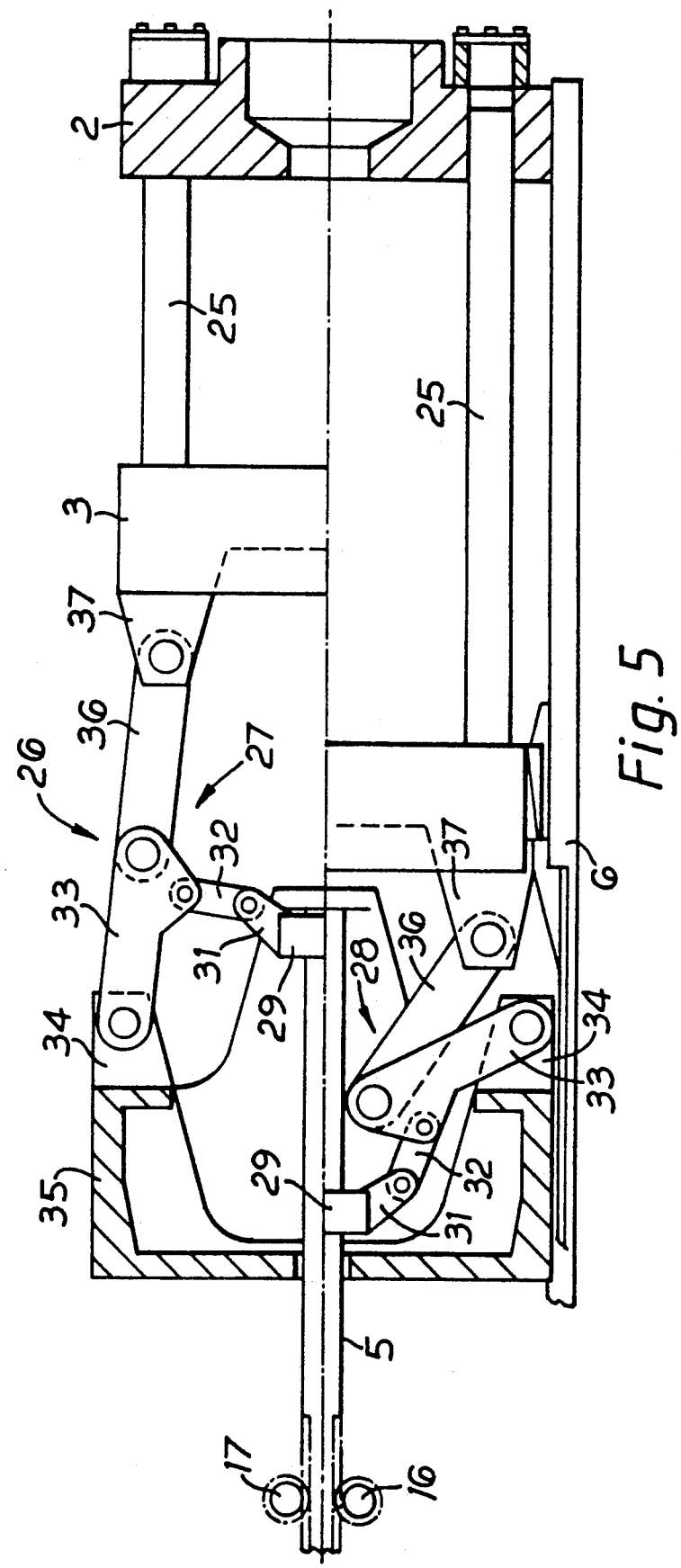
FIG. 5 is a side view, partly in section, showing in greater detail a toggle arrangement that can be used in the embodiments of FIG. 1 or 3.

FIG. 5 illustrates in greater detail the relationship between the fixed and movable plates 2,3 and the rack 5 and associated drive. In addition, these Figures illustrate how a toggle mechanism is used to lock the movable plate 3 relative to the fixed plate 2 during the actual molding operation, the toggle mechanism being driven by the rack 5 rather than via an hydraulic actuator or ball screw as is conventional The movable plate 3 is mounted on four tie rods 25 secured at one end to the fixed plate 2. The toggle mechanism, indicated generally at 26, comprises an upper portion 27 and a lower portion 28, each portion being identical and attached to the upper and lower sides, respectively, of the rack 5 via blocks 29. Each block 29 is provided with a fixed link 31 to which is pivotally attached one end of a first movable link 32, the other end of which is pivotally attached intermediate the ends of a second movable link 33. One end of the movable link 33 is pivotally attached to a lug 34 carried by a C-shaped support bracket 35 attached to the machine frame 6. The other end of the second movable link 33 is pivotally attached to one end of a third movable link 36, the other end of which is pivotally attached to a lug 37 carried by the movable plate 3. It will be appreciated that FIG. 5 illustrates in the upper left-hand half the toggle mechanism in the extended, lock-out position, and in the lower left-hand half illustrates the toggle in the retracted position.

The untoothed portion of the rack 5 extends through an aperture in the support bracket 35 and is provided, as already described above, with two opposed series of teeth 12a and 12b with which mesh the respective pinions 16 and 17. With the injection moulding machine in the open position, i.e. with the movable plate 3 retracted from the fixed plate 2, the toggle mechanism is in the folded or retracted position shown in the lower left-hand portion of FIG. 5. When it is required to perform a molding operation, the servomotor 10 is energised and the rack 5 is moved to the right in the manner already described above. As the rack 5 moves to the right, the two fixed links 31 act on the movable links 32,33 and 36 in a manner to unfold them, resulting in the second and third movable links 33 and 36 finally being substantially in line with each other in which position they are locked out by the action of the fixed link 31 and first movable link 32, further movement of the rack 5 serving to build up the required locking force as between the plates 2 and 3.

I claim:

1. A molding machine comprising a base frame, two mold plates mounted on said base frame for relative movement between a mold open position and a mold closed position, and linear drive means mounted on said base frame and operable to move at least one of said mold plates, said linear drive means comprising at least one servomotor, at least one set of gears driven by said servomotor, and a toothed rack connected to said at least one mold plate said toothed rack having opposed series of teeth, one series of teeth in mesh with at least one gear of said set of gears, another gear opposed to said one gear and in mesh with the other series of teeth, and means for supporting said toothed rack whereby the rack and said at least one mold plate are driven in operation of the servomotor.

2. A machine as claimed in claim 1, wherein said rack is provided with series of teeth on at least two sides, and wherein two drive gears of said set of gears are in mesh with respective ones of said series of teeth on said rack.

3. A machine according to claim 2, wherein said rack is provided with series of teeth on two opposed sides.

4. A machine as claimed in claim 2, wherein said drive gears are driven via separate sets of gears.

5. A machine as claimed in claim 4, wherein said separate sets of gears are driven by separate drive servomotors.

6. A machine has claimed in claim 1, wherein said rack as a substantially circular cross-section and said or each said series of teeth are provided only over a portion of the length of said rack.

7. A machine as claimed in claim 6, wherein said rack is slidably mounted in bearings on each side of the toothed portion.

8. A machine as claimed in claim 1, wherein the machine further comprises a casing, and wherein said gears and at least a portion of said rack are arranged inside said casing, said rack being led through a wall of said casing.

9. A machine as claimed in claim 8, wherein said rack is supported in a bearing in said wall of the casing, the bearing being provided with a seal.

10. A machine as claimed in claim 1, wherein said drive means comprises at least two racks driven by respective sets gears.

11. A machine as claimed in claim 1, wherein said servomotor is energised from a power supply apparatus which receives as feedback signals a signal from a position transducer to monitor the position of said rack, and a force signal to monitor the locking force between said mold plates.

12. A machine as claimed in claim 1, wherein one of said mold plates is fixed and the other of said mold plates is moveable relative to said one mold plate.

13. A machine as claimed in claim 1, wherein toggle means is provided for locking said mold plates in the mold closed position, the toggle means being mounted between said rack, said base frame, and said at least one mold plate.

14. A machine as claimed in claim 1 in the form of an injection molding machine.

15. A drive arrangement for a molding machine, said molding machine comprising a base frame, and two mold plates mounted on said base frame for relative movement between a mold open position and a mold closed position, said drive arrangement comprising linear drive means mounted on said base frame and operable to move at least one of said mold plates, said linear drive means comprising at least one servomotor, at lest one set of gears driven by said servomotor, and a toothed rack connected to said at lest one mold plate said toothed rack having opposed series of teeth, one series of teeth in a mesh with at least one gear of said set of gears, another gear opposed to said one gear and in mesh with the other series of teeth, and spaced bearings supporting said toothed rack whereby the rack and said at least one mold plate are driven in operation of the servomotor.

16. A drive arrangement as claimed in claim 15, wherein toggle means is provided for locking said mold plates in the mold closed position, the toggle means being mounted between said rack, said base frame and said at least one mold plate.

17. A drive arrangement as claimed in claim 15 or 16 in a molding machine the form of an injection molding machine.

* * * * *